(No Model.)

W. C. RAWLEY.
BUSHING AND FAUCET FOR BARRELS.

No. 605,612. Patented June 14, 1898.

Witnesses,
J. H. Annse
E. A. Brandau

Inventor,
William C. Rawley
By Dewey & Co,
Attys

UNITED STATES PATENT OFFICE.

WILLIAM C. RAWLEY, OF SAN FRANCISCO, CALIFORNIA, ASSIGNOR TO THE AMERICAN FAUCET COMPANY, OF SAME PLACE.

BUSHING AND FAUCET FOR BARRELS.

SPECIFICATION forming part of Letters Patent No. 605,612, dated June 14, 1898.

Application filed October 22, 1897. Serial No. 656,008. (No model.)

*To all whom it may concern:*

Be it known that I, WILLIAM C. RAWLEY, a citizen of the United States, residing in the city and county of San Francisco, State of California, have invented an Improvement in Bushings and Faucets for Barrels; and I hereby declare the following to be a full, clear, and exact description of the same.

This invention relates to certain improvements in bushing for barrels and casks and like devices.

It consists in the parts and the constructions and combinations of parts hereinafter described and claimed.

Figure 1:
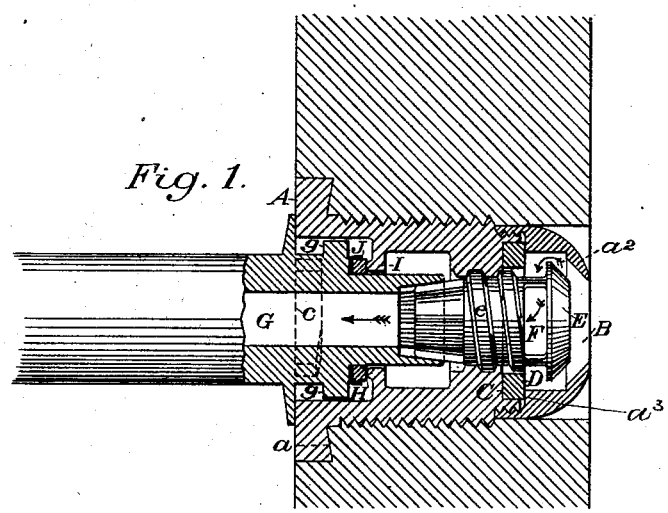
Figure 2:
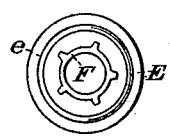
Figure 3:
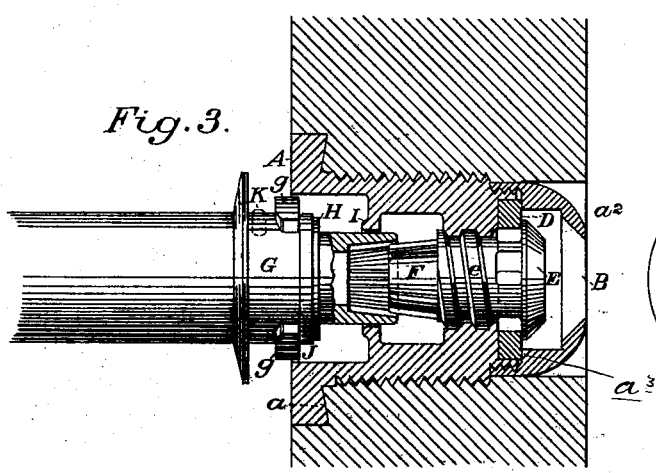
Figure 4:
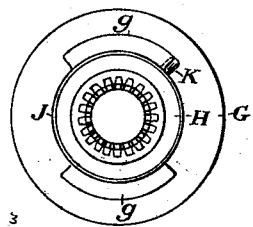
Figure 5:
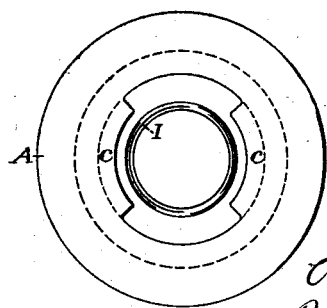

Figure 1 is a longitudinal section with the valve open. Fig. 2 is an end view of the valve. Fig. 3 shows the valve closed. Fig. 4 is a view of the inner end of the faucet. Fig. 5 is a front view of the bushing.

In the application of this invention a bushing A is employed which is adapted to fit into the opening in the barrel or cask and which in the present instance is shown as provided with screw-threads, so that it may be screwed in and permanently secured in the cask.

The outer end of the bushing is here shown with an annular flange the inner face of which is undercut or beveled inwardly, as shown at $a$, so that it may be seated in a corresponding groove made in the cask and form a tight joint to prevent leakage around the bushing.

The inner end of this bushing, which projects into the cask, is screw-threaded and has a cap $a^2$ removably attached to it. This cap has a central opening B in the smooth surface of the end, which opening serves for the passage of the liquid when the valve is opened, as will be hereinafter more fully explained. The inner face around this opening forms a seat for the inner end of the valve. An annular shoulder C is formed within this end of the bushing A, and has a washer D, forming a seat at a short distance from and opposite to the seat in the cap $a^2$, so that the valve E may be moved to close against either seat or to stand between the two when it is opened for the passage of liquid through it. An annular shoulder $a^3$ is also formed around the inner surface of the cap, so as to close against and form a joint with the outer periphery of the inner valve-seat.

The valve E has a stem the central part of which is enlarged and screw-threaded at $e$ to turn in a similarly-threaded portion near the inner end of A, so that by turning the valve it may be moved to close against either seat. When it is closed to prevent the escape of the contents of the cask, it closes against the seat D. When it is opened, it stands at a point intermediate between the valve-seats B and D, and passages are provided for the escape of the liquid, which enters through the opening at B, thence around the valve, and thence through the interior of the bushing, as shown by arrows in Fig. 1.

When the valve is forced inward, so as to seat at the inner end and close the opening at B, it places the bung or bushing in condition for the pitching of the barrel or cask by preventing any ingress of the pitch through the opening B. As soon as this pitching has been completed the valve may be again returned to its normal position, so as to close upon the seat D, or to be opened therefrom for the escape of the liquid, which can thereafter always flow through the opening at B, and thence around the valve and through openings to the interior of the hollow valve-stem F, which extends into the interior of the bushing A and has its inner end provided with a head of any suitable description which will allow the key or faucet to engage with it when introduced into the bushing A, so that when the key or faucet is turned the valve may be opened to or from its seat.

It will be understood that the stem or head of the valve may be formed in any well-known or desired form, either triangular, rectangular, or star-shaped, with any number of points, preferably multiples of the smallest number, which may be formed upon the opposing coupling or connection, and the inner end of the key or faucet G is provided with a correspondingly-shaped plug or socket, which will fit the end of the valve whenever the key or faucet is introduced.

Fig. 1 shows the male portion of the coupling upon the valve-stem and the female portion upon the key or faucet. This key or faucet has inclined or beveled lugs $g$, which engage corresponding lugs $c$ in the interior of the bushing A, so that when the faucet is turned the action of the beveled lugs upon each other will cause the faucet to be drawn inward and a tight joint maintained between the disk H of the faucet and the raised annular seat I within the bushing. The object of this is to make a tight joint at this point when the faucet is first introduced and before it is turned enough to move the valve E from its seat. The disk H is of soft rubber or other material, and its central opening fits snugly around the faucet-shank.

The disk H is inclosed within an annular cap J, which prevents its being crushed or forced out of place by pressure so as to cause leakage. This cap J also turns loosely about the faucet-shank, so that when the faucet is turned to lock it in the bushing the soft disk H remains stationary upon the seat I, while the faucet-shank turns within the cap, and any rubbing friction takes place between the cap and faucet and not upon the disk.

A pin or lug K is fixed to the faucet-shank at such a point that it will strike the end of one of the lugs c in the bushing when the faucet is connected and in proper position, so that it is only necessary to introduce the faucet-shank until the washer H rests upon the seat I, then turn the faucet a quarter of a revolution, which will insure a tight joint at that point, and at the same time, by the engagement of the faucet end and valve, the latter will be turned and moved away from its seat to allow liquid to flow through into the faucet, the escape from which is controlled by any usual form of plug or cock.

The valve E is of such a length that it will not seat to close both the openings at B and D at one time, but it may be closed against either of said seats or openings by turning it in a proper direction. Its periphery is screw-threaded, and it fits in corresponding threads in the interior of the bushing A, so that when its end is engaged by the faucet or key to turn it it may be advanced or retracted to close against either of the seats. It is normally closed against the seat D to prevent the passage of liquid, and it is open when moved away from this seat and standing intermediate between B and D. The liquid enters freely through the passage B, and thence is caused to pass around the valve D either by channels in the sides of the bushing or casing, A through which the liquid may flow, or by channels in the sides of or through the valve itself, or in any other suitable or desirable manner, the object being simply to provide a space through which the liquid can pass around the valve, and thence escape through the opening within the hollow valve-stem and into the chamber of the bushing, whence it passes out through the faucet whenever the valve is opened. By this construction the valve can be operated to open or close the passage for the discharge of liquid in a very simple manner, and when the cask or barrel is to be pitched it is only necessary to turn the valve by the aid of a properly-shaped key, as previously described, until the inner face is closed against the seat at the inner end of the bushing, thereby entirely closing the opening B and preventing any pitch or material from the interior of the cask entering the valve. As soon as the work is completed the valve may be withdrawn, leaving the opening B free and the valve closed against the seat D.

It will be understood that the seat against which the valve closes at D may be formed of rubber or other suitable material, and it may either be affixed to the seat at D or it may be carried upon the valve by being properly vulcanized thereon, the object in either case being attained when the two faces are brought together.

Having thus described my invention, what I claim as new, and desire to secure by Letters Patent, is—

1. A bushing fitting a cask or receiver, a cap removably fitting the inner end of said bushing having a central aperture with an interiorly-formed valve-seat, a second seat formed within the bushing and opposed to the first-named valve-seat with a space between the two, a valve movable between the two seats so as to close upon one or the other and an annular shoulder formed around the inner surface of the removable cap so as to close against and form a joint with the outer periphery of the inner valve-seat.

2. A bushing fitting a cask or receiver having screw-threads upon the inner end, and an annular groove or channel adapted to receive a removable annular ring forming a seat against which the interior face of a valve movable within the bushing is adapted to close, a removable screw-threaded cap fitting the threads upon the inner end of the bushing having a central opening and a ledge or shoulder adapted to fit against the removable seat when the cap is screwed in place.

3. A bushing fitting a cask or receiver having a screw-threaded interior end and a correspondingly-threaded removable cap with a centrally-formed opening and valve-seat, shoulders formed upon the interior of the cap and upon the inner end of the bushing, a removable ring adapted to fit and be clamped between said shoulders when the cap is in place, said ring forming an inner seat for a valve which is movable between the said inner seat and the outer one formed in the cap.

4. A bushing fitting a cask or receiver having a screw-threaded removable cap upon the inner end, shoulders formed upon the inner end of the bushing and upon the interior of the cap, an annular ring adapted to be clamped between said shoulders and forming a seat, a double-faced valve having a tubular stem, and movable inwardly to close one face against said seat and outwardly to close the other face against a corresponding seat formed centrally through the cap, screw-threads upon the enlarged central portion of the valve-stem engaging corresponding threads in the interior of the bushing, a head formed upon the inner end of the tubular valve-stem, a faucet-barrel having a corresponding formation upon the inner end to engage said head and turn the valve, spiral locking-lugs upon the faucet-barrel, corresponding lugs upon the inner surface of the bushing, and an annular elastic disk inclosing the faucet-stem interior to the locking-lugs to prevent leakage.

5. A bushing fitting a cask or receiver having a removable cap on the inner end with a central aperture and an interior valve-seat, a second seat opposed thereto within the bushing and forming a space between the two, said cap having an internal shoulder opposing the valve-seat within the bushing, to make a joint therewith, a valve movable between the two seats, and passages through which liquid may pass when the valve stands intermediate between the seats, a chamber within the bushing adapted to receive the inner end of a faucet, a head upon the valve-stem and a correspondingly-shaped formation upon the inner end of the faucet which will engage the head of the valve-stem when the faucet is introduced, spiral lugs in the interior of the bushing and also around the faucet-barrel adapted to engage and lock the faucet simultaneously with the movement of the valve when the faucet is turned, and a washer adapted to make a tight joint between the faucet and the bushing, said washer having an inclosing cap turnable upon the faucet-barrel, whereby the latter is movable within the washer after the latter has become seated.

In witness whereof I have hereunto set my hand.

WM. C. RAWLEY.

Witnesses:
S. H. NOURSE,
JESSIE C. BRODIE.